United States Patent
Carter et al.

(10) Patent No.: US 7,292,319 B1
(45) Date of Patent: Nov. 6, 2007

(54) OPTICAL TRACKING DEVICE EMPLOYING A THREE-AXIS GIMBAL

(75) Inventors: Dennis L. Carter, Hudson, OH (US);
Susan E. Hall, Wadsworth, OH (US);
Allen T. Hicks, Uniontown, OH (US);
Charles T. Knorr, Akron, OH (US);
Alan F. Lindsay, Massillon, OH (US);
Timothy E. Macklin, Newton Falls, OH (US)

(73) Assignee: Lockheed Martin Corp., Akron, OH (US)

( * ) Notice: Subject to any disclaimer, the term of this patent is extended or adjusted under 35 U.S.C. 154(b) by 0 days.

(21) Appl. No.: 11/446,619

(22) Filed: Jun. 5, 2006

Related U.S. Application Data

(63) Continuation of application No. 11/136,795, filed on May 24, 2005, now abandoned.

(51) Int. Cl.
*G01P 3/36* (2006.01)
*G01B 11/26* (2006.01)
*G01C 1/00* (2006.01)

(52) U.S. Cl. .................................. 356/29; 356/139.08
(58) Field of Classification Search .................. 356/29, 356/139.03, 139.08, 149; 244/3.13, 3.16; 33/318, 321
See application file for complete search history.

(56) References Cited

U.S. PATENT DOCUMENTS

| | | | | |
|---|---|---|---|---|
| 2,705,371 A * | 4/1955 | Hammond, Jr. ............... | 89/202 |
| 3,310,877 A * | 3/1967 | Slater ........................... | 33/268 |
| 4,027,540 A | 6/1977 | Allard .......................... | 74/5.1 |
| 4,386,848 A * | 6/1983 | Clendenin et al. .......... | 356/5.01 |
| 4,393,597 A | 7/1983 | Picard et al. ................ | 33/275 |
| 4,404,592 A * | 9/1983 | Pepin et al. ................. | 348/169 |
| 4,853,528 A * | 8/1989 | Byren et al. ................. | 250/201.9 |
| 5,088,818 A | 2/1992 | Nicholson ................... | 356/152 |
| 5,203,220 A | 4/1993 | Lerman ....................... | 74/5.22 |
| 6,396,235 B1 | 5/2002 | Ellington et al. ............ | 318/649 |
| 6,674,520 B1 | 1/2004 | Hicks et al. ............. | 356/139.04 |
| 2004/0173726 A1* | 9/2004 | Mercadal et al. ........... | 248/660 |
| 2004/0233420 A1* | 11/2004 | Deflumere et al. ..... | 356/139.03 |
| 2006/0192946 A1* | 8/2006 | Walser ........................ | 356/144 |

FOREIGN PATENT DOCUMENTS

JP 2006085143 A * 3/2006

\* cited by examiner

*Primary Examiner*—Isam Alsomiri
(74) *Attorney, Agent, or Firm*—Renner Kenner Greive Bobak Taylor & Weber

(57) ABSTRACT

An optical tracking device, includes an azimuth sub-assembly providing a 360-degree range of motion and a transducer sensing the azimuth position within this range of motion; and an elevation sub-assembly coupled to the azimuth sub-assembly and providing at least a −30-degree to +100-degree range of motion and a transducer sensing the elevation position. A cross-elevation sub-assembly is coupled to the elevation sub-assembly and provides at least a ±14-degree optical range of motion and a transducer sensing the cross-elevation position. An elevation gyroscope is affixed to the elevation sub-assembly and generates an elevation rate signal; and a cross-elevation gyroscope is affixed to the elevation sub-assembly and generates a cross-elevation rate signal. A controller receives the azimuth, elevation, and cross-elevation position signals, and the elevation and cross-elevation rate signals and sends command signals to the sub-assemblies to initiate movement to allow inertially stabilized tracking of an object.

15 Claims, 4 Drawing Sheets

OPTICAL TRACKING DEVICE EMPLOYING A THREE-AXIS GIMBAL

CROSS REFERENCE TO RELATED APPLICATION

This application is a continuation of application Ser. No. 11/136,795 filed May 24, 2005, now abandoned which is hereby incorporated by reference.

TECHNICAL FIELD

The present invention herein resides in the art of electro-optical tracking devices. More particularly, the present invention relates to a laser/camera-based system that provides simultaneous tracking, identification, and defeat operations against a hostile object as both the laser/camera and the object move. Specifically, the present invention relates to an electro-optical tracking device employing a three-axis gimbal assembly to efficiently track an object throughout a hemisphere plus field-of-regard, including about and through a nadir position.

BACKGROUND ART

To protect and defend military platforms, such as ships, aircraft, and ground-based installations, it is known to provide countermeasure systems that detect incoming threats such as enemy aircraft or missiles. Known systems detect incoming threats and then deploy defensive countermeasures in an attempt to divert or destroy the threat. These systems are referred to as open-loop systems since no immediate determination as to the type of threat or the effectiveness of the countermeasure is inherent in their operation. Due to the inefficiency of open-loop systems, closed-loop systems have been developed.

There are known performance benefits to using a directional, laser-based, closed-loop infrared countermeasure system to defeat infrared guided missiles. In a closed-loop system, the incoming missile type is identified, and the countermeasure system generates a jam signal according to the specific characteristics of the incoming missile. This optimized jam signal is directed at the missile and induces it to execute a turn-away maneuver from its intended target. An additional feature of closed-loop techniques is their ability to monitor the classification and identification processes during the jamming operation, so as to provide a direct measure of the countermeasure effectiveness as well as an indication of necessary corrective actions in the generation of the jam signal. It will be appreciated that the benefits of the closed-loop system performance must be balanced against the cost of upgrading existing infrared directional countermeasure systems to employ a closed-loop capability, or against the cost of developing an entirely new closed-loop system.

One possible configuration for introducing a closed-loop receiver into an open loop-directional countermeasure system is to use a high-resolution tracking sensor in parallel with an infrared detector assembly. Accordingly, an independent receive channel, which is a separate optical path, must be added to the detection system along with a separate expensive cryogenically cooled detector. The cost and size impact of such a configuration to the countermeasure system is often prohibitive.

Another approach is to incorporate an infrared detector assembly into the countermeasure system and optically divert (or split-off) a portion of the receive optical signal for the high resolution tracking sensor. Unfortunately, this approach causes at least a 50% loss of receive signal strength for both the track sensor and the receiver, and it entails the cost for adding a cryogenically cooled detector. Another problem with this approach is that the optical apertures required by the sensor and the detector may require a larger overall assembly to accommodate them.

Based upon the foregoing, a need arose in the art for a single imaging infrared receiver having a focal plane array capable of frame rates sufficient to provide sensor data for three primary closed-loop countermeasure functions: a passive high-resolution tracking capability, the ability to receive and process laser signals, and finally, the ability to perform countermeasure effectiveness measurements. Further, the receiver function must not be impaired by the transmission of the laser jam signal.

The foregoing problems have been addressed in U.S. Pat. Nos. 6,369,885 and 6,674,520, both of which are incorporated herein by reference. With the implementation of the advantageous features of the aforementioned patents, additional needs have become apparent. The prior art tracking devices utilize pointers, which are considered to be expensive, and of a size sufficient to inflict undesirable drag penalties on aircraft that employ them. Further, many previous pointers utilized in closed-loop infrared countermeasure (IRCM) systems are unable to efficiently and accurately track incoming threats due to slow responses and limitations in the pointer apparatus. For example, some known pointers cannot track through the nadir position, because their gimbal geometry requires unachievable acceleration of the pointer assembly about the azimuth axis to do so. Dual path pointers, wherein the laser transmit and receiver paths are maintained separately, require precision alignment of the pointer optics to maintain parallelism; this alignment is difficult to achieve, and if it is not maintained, the device fails to operate as intended. In order to overcome the aforementioned problems it is known to provide a two-axis agile mirror for fine tracking carried by a two-axis coarse gimbal. However, such an assembly is found to be quite expensive. The prior art pointers are also lacking inasmuch as a significant amount of laser back scatter into the receive path is encountered, and, in addition, the previous systems require precision difficult to achieve and maintain alignment of pointer transmit and receive path mirrors. Previous dual path pointers also require laser transmit path holes in the receive path fold mirror located between the pointer and the camera. Accordingly, such a construction results in an undesirable amount of signal loss due to blockage of the camera receive signal path.

Based upon the foregoing, it is apparent that there is a need in the art for an improved tracking device, which offers the ability for the camera and countermeasure laser to employ the same optical path. There is also a need for a simplified gimbal construction, which allows for tracking of an object about and through nadir, and, which uses lower cost components to achieve the desired performance.

DISCLOSURE OF INVENTION

In light of the foregoing, it is a first aspect of the present invention to provide an optical tracking device employing a three-axis gimbal assembly.

The foregoing and other aspects of the present invention, which shall become apparent as the detailed description proceeds, are achieved by an optical tracking device, comprised of an azimuth sub-assembly providing a 360-degree continuous range of motion and a transducer sensing the azimuth position within this range of motion; an elevation sub-assembly coupled to the azimuth sub-assembly and providing a −30-degree to +100-degree range of motion and a transducer sensing the elevation position within this range of motion; a cross-elevation sub-assembly coupled to the elevation sub-assembly and providing a +14-degree optical range of motion and a transducer sensing the cross-elevation position within this range of motion; an elevation gyroscope coupled to the elevation sub-assembly and generating an elevation rate signal; a cross-elevation gyroscope coupled to the elevation sub-assembly and generating a cross-elevation rate signal; and a controller receiving the azimuth, elevation, and cross-elevation position signals, and the elevation and cross-elevation rate signals and sending command signals to the sub-assemblies to initiate movement within their respective ranges of motion to allow inertially stabilized tracking of an object by the device.

These and other objects of the present invention, as well as the advantages thereof over existing prior art forms, which will become apparent from the description to follow, are accomplished by the improvements hereinafter described and claimed.

BRIEF DESCRIPTION OF THE DRAWINGS

For a complete understanding of the objects, techniques and structure of the invention, reference should be made to the following detailed description and accompanying drawings, wherein.

BEST MODE FOR CARRYING OUT THE INVENTION

Figure 1:
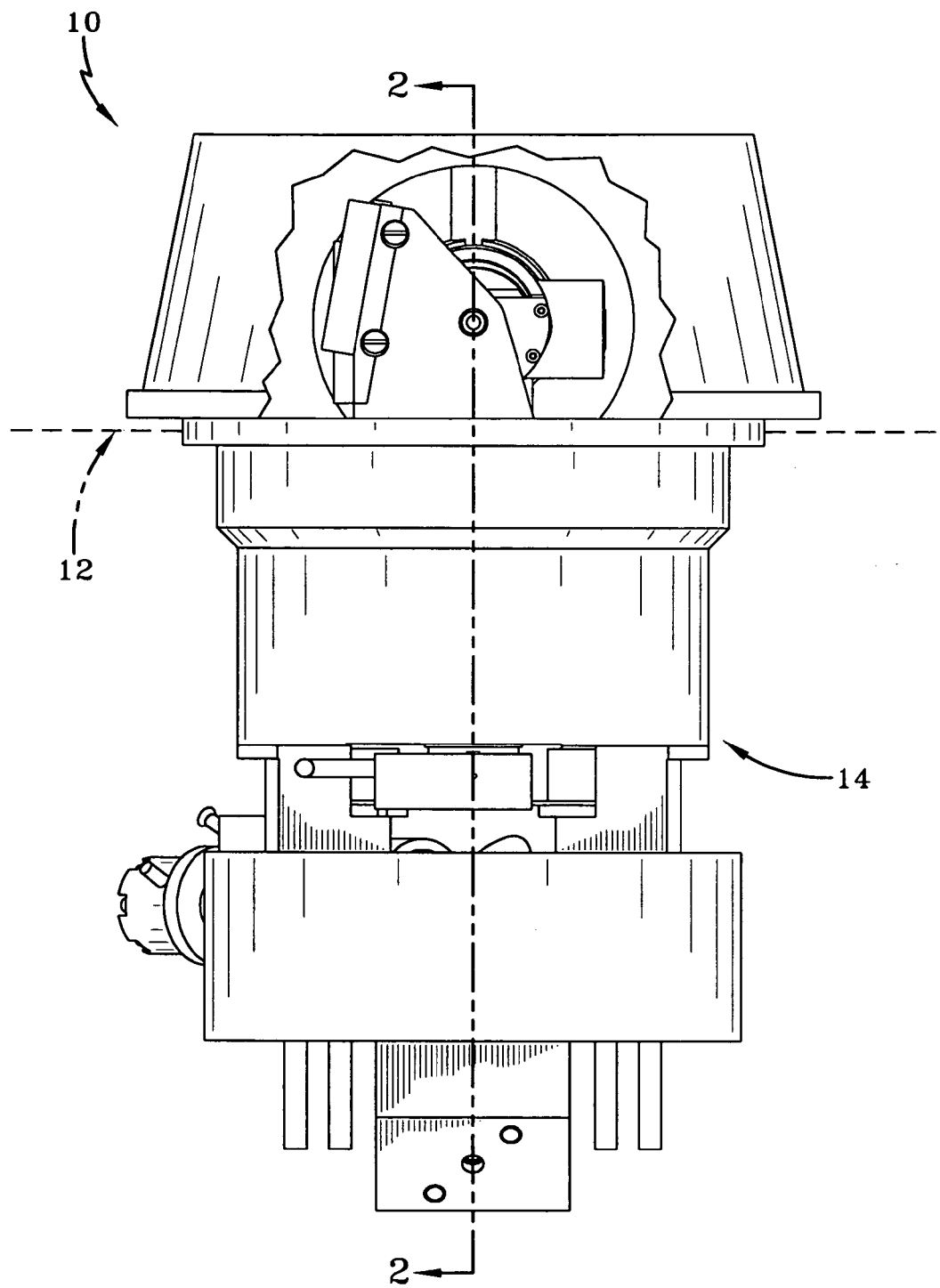
FIG. 1 is an elevational view of an optical tracking device employing a three-axis gimbal according to the concepts of the present invention.
Figure 2:
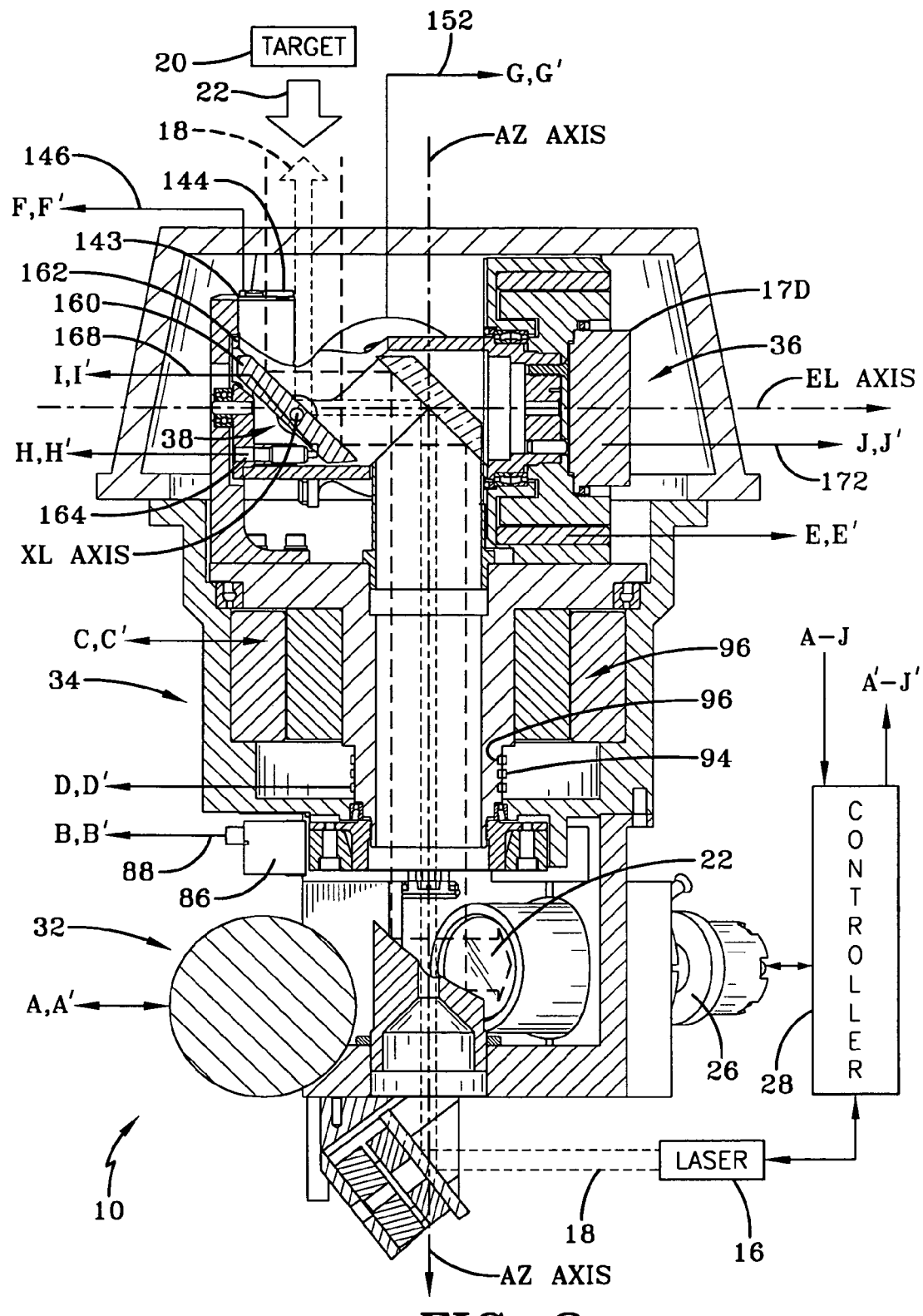
FIG. 2 is a cross-sectional view of the device taken along lines 2—2 of FIG. 1.
Figure 3:
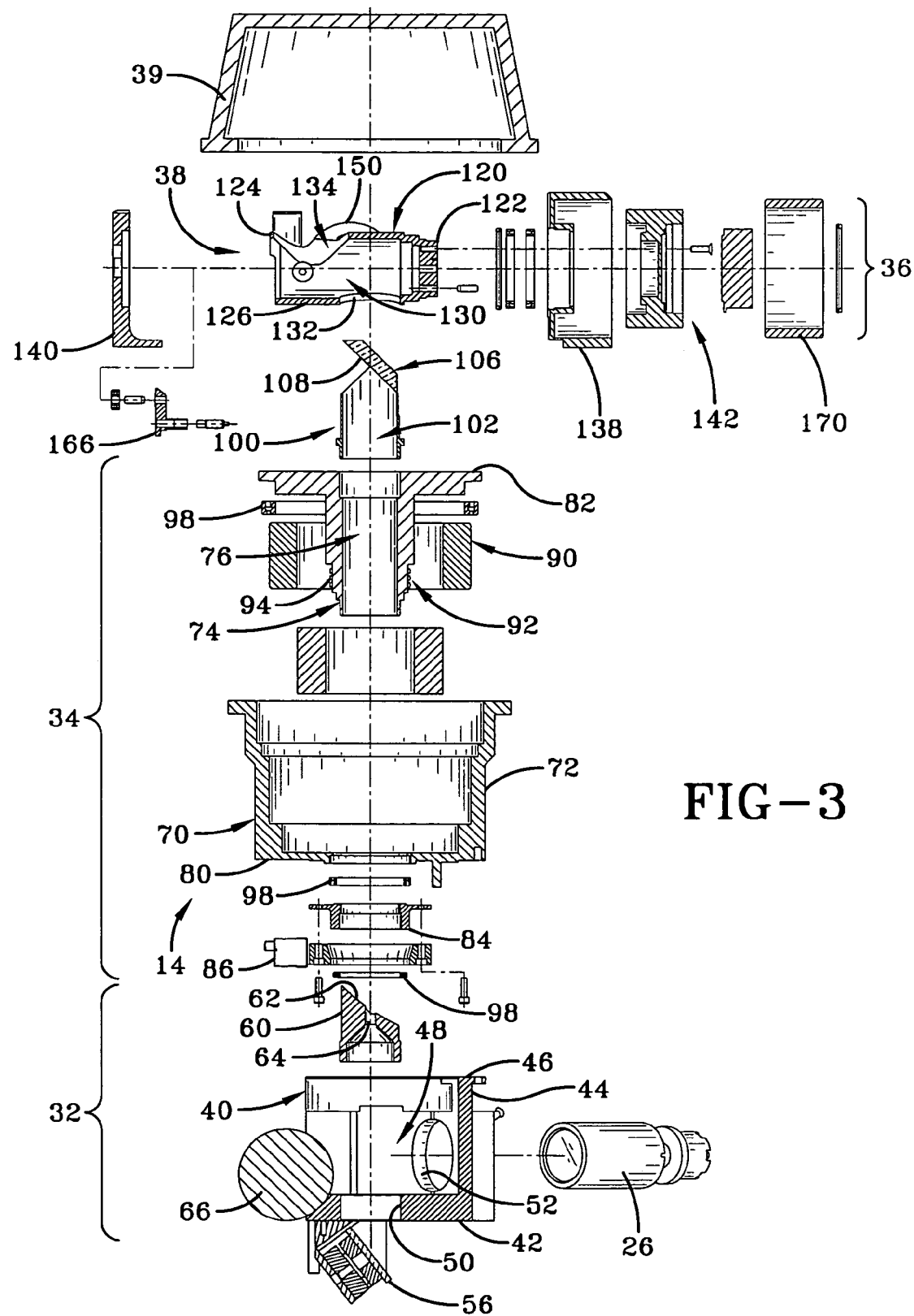
FIG. 3 is an exploded view of the optical tracking device.

Referring now to the drawings and, in particular to FIGS. 1–3, it can be seen that an optical tracking device according to the present invention is designated generally by the numeral 10. It will be appreciated that the device 10 is incorporated on to a platform 12 such as a plane, ship, tank or other ground-based installation. The device is mounted in a way to provide hemispherical coverage. The tracking device is employed to detect and track the motion of an in-bound infrared missile or other target. It will be appreciated that because the target and platform are likely to be moving unpredictably, the tracking device employs a gimbal assembly 14 to direct and inertially stabilize its optical line-of-sight. Although an infrared-based system is disclosed, it will be appreciated that the aspects of the present invention are applicable to observable phenomena at other electromagnetic wavelengths.

The gimbal assembly 14 is coupled with a laser 16 or other light source. The laser 16 is an application specific device and projects an acquisition signal 18 through the device 10 to illuminate a target 20 for purposes of identification, tracking, and guidance spoofing. The laser beam acquisition signal 18, which is an optical signal, is directed at the target and, upon impinging thereon, generates a return optical signal designated generally by the numeral 22. This return signal is received by the gimbal assembly 14 and routed by its internal and associated components for receipt by a camera 26. In the present embodiment it is envisioned that the camera 26 is an infrared camera specific to the type of return signal expected from the laser 16. The laser 16 and the camera 26 are connected to a controller 28, which receives input data from both to determine the type of threat and the action required specific to that type. The controller 28 provides the necessary software, hardware, memory and power distribution for controlling and coordinating various components of the tracking device 10. Based upon the inputs received by the controller 28, designated in the drawings as for example by capital letters A–J, the controller in turn generates a plurality of command signals designated herein as for example A'–J'. These command signals are employed to keep the device directed optical line-of-sight pointed at the target, despite unpredictable movements of the latter and the platform. It will be appreciated that power sources (not shown), which may be separate or integral with the device 10, are employed to power the controller 28, the laser 16, the camera 26, and other components maintained by the gimbal assembly 14 for the purpose of implementing the teachings of the present invention. The controller 28 may also be connected to other systems maintained by the platform 12 for the purpose of communicating with the command structure controlling operation of the platform. As such, other defensive measures may be employed by the platform based upon information provided by the optical tracking device 10.

The gimbal assembly 14 includes four sub-assemblies that act in concert with one another to implement the tracking of a target. In particular, the gimbal assembly 14 includes a head assembly 32, which carries the laser, the camera, the controller, and other components that will be described. Coupled to the head assembly 32 is the azimuth sub-assembly 34; coupled to the azimuth sub-assembly 34 is the elevation sub-assembly 36; and coupled to the elevation sub-assembly 36 is the cross-elevation sub-assembly 38. These sub-assemblies are so arranged that the azimuth sub-assembly rotates the elevation and cross-elevation sub-assemblies about the azimuth axis (designated as AZ) through a continuous 360-degree range of motion relative to the head assembly; the elevation sub-assembly rotates the cross-elevation sub-assembly about the elevation axis (designated as EL) through a −30-degree to +100 degree range of motion relative to the azimuth sub-assembly; and the cross-elevation sub-assembly provides a ±14-degree optical range of motion about the cross-elevation axis (designated as XL) relative to the elevation sub-assembly. By generating various status and position signals, the sub-assemblies supply information to the controller 28, which in turn generates the appropriate command signals to maintain the gimbal assembly directed line-of-sight pointed at the target. A protective dome 39 encloses the sub-assembly 38, but allows the optical signals 18 and 22 to pass therethrough.

The head sub-assembly 32 includes a frame 40 which may be mounted to the platform 12. The frame 40 includes a base 42 from which extends an annular sidewall 44. The sidewall 44 extends from the periphery of the base 42 and provides a sidewall edge 46. The sidewall 44 and the base 42 define a frame cavity 48. Extending through the base 42 is an axial bore 50. And extending through the sidewall 44 is a cross bore 52. A laser fold mirror 56 is mounted to the base 46 opposite the frame cavity 48 and is angularly positioned about the axial bore 50. The laser fold mirror 56 functions to direct the laser beam acquisition signal 18, which is radially directed toward the mirror, into the frame cavity 48 and other components of the gimbal assembly 14. The laser fold mirror 56 is optional inasmuch as the laser 16 may be positioned axially with respect to the axial bore 50 so as to directly input the laser beam acquisition signal. However, if required by structural limitations of the platform and/or the device 10, the laser 16 may be positioned in such a manner so as to direct the laser beam toward the laser fold mirror 56 which directs the acquisition signal accordingly.

The camera 26 is received in the cross bore 52 and extends into the frame cavity 48 as appropriate. Received within the axial bore 50 is a camera fold mirror 60 which provides an angled mirror surface 62. Axially extending through the mirror 60 is a beam aperture 64. In this embodiment it is believed that the aperture is approximately 10 millimeters in diameter. The beam aperture 64 is positioned to be in relation to the laser fold mirror, if provided, so as to direct the laser beam acquisition signal into the remaining sub-assemblies. It will also be appreciated that the mirror surface 62 is oriented in such a way so as to receive the return signal 22 and reflect it to the infrared camera 26 for processing. A cryogenic cooler 66 is carried by the frame 40 and is utilized to maintain the appropriate operating temperature range for the camera 26 and related components. Operational signals are provided by the camera 26 and the cooler 66 (A, A') between the controller 28 as needed.

The azimuth sub-assembly 34 is mounted to the head assembly 32 and in particular to the sidewall edge 46. The azimuth sub-assembly 34 includes an external casing 70 which is mounted and/or secured to the sidewall 44 or the sidewall edge 46. The external casing 70 includes an external casing surface 72. Rotatably received within the external casing 70 is a body 74, which is journaled so as to allow for 360-degree rotation thereof. Extending axially through the body 74 is a body bore 76, which is aligned with the head sub-assembly axial bore 50. Moreover, the body bore 76 is axially aligned with the beam aperture 64. The casing 70 includes a read end 80 which is opposite a mirror end 82 of the body 74 when assembled to the casing. The read end 80 carries an etched encoder ring 84. Supported by the external casing 70 is an azimuth encoder read head 86, which is juxtaposed with respect to the encoder ring 84. The azimuth encoder read head 86 generates an azimuth position signal 88 (B,B'), which is received by the controller 28 such that, as the body 74 rotates within the external casing 70, an appropriate position signal is generated for input to the controller.

An azimuth motor 90 is disposed between the casing 70 and the body 74 so as to generate the necessary torque for rotating the body within the casing. In the preferred embodiment, the azimuth motor is a direct drive, permanent magnet, brushless and, slotless 2-phase motor. The motor 90 is connected to the controller 28 (C,C') so as to allow for transmission of power thereto. A plurality of slip rings 92 are provided between the external casing 70 and the body 74 for the purpose of transmitting electrical signals (D,D') and power to and from the sub-assemblies 34, 36 and 38 and the controller 28. In particular, each slip ring 92 includes a casing contact 94, which is connected to the controller 28, and a body contact 96, which is disposed around the body 74 and connected to a respective component maintained by the sub-assemblies. It will be appreciated that at least one bearing and ideally a plurality of bearings 98 are provided between the casings 70 and the body 74 to allow for full 360-degree rotation of the body with respect to the casing.

A tubular column 100 extends axially from the mirror end 82. The column 100 is concentrically positioned about the mirror end and provides a column opening 102 that extends through and is aligned with the body bore 76. The column 100 carries an angularly oriented azimuth fold mirror 106, which partially covers the column opening 102. The fold mirror 106 includes an azimuth mirror surface 108, which is aligned with the camera fold mirror surface 62 and that of the laser fold mirror 56. The mirror surface 108 functions to reflect the laser beam acquisition signal 18 and the return signal 22 as needed. The mirror surface 108 will be oriented at nominally a 45-degree angle to the azimuth axis. The azimuth sub-assembly serves to position the elevation and cross-elevation sub-assemblies to support target tracking as will be described below.

The elevation sub-assembly 36 is mounted to the azimuth sub-assembly 34 and in particular to the mirror end 82 of the body 74. It will further be appreciated that the elevation sub-assembly is disposed around the mirror end column 100. The elevation sub-assembly 36 includes a spindle designated generally by the numeral 120. The spindle 120 includes a motor end 122 opposite a mirror end 124. The spindle 120 is constructed with a tubular wall 126 between the ends 122 and 124. The wall 126 defines a chamber 130 to allow for transmission of the optical signals 18 and 22. Extending through the tubular wall 126 is a column opening 132. The opening 132 is sized to allow for receipt of the column 100 and the azimuth fold mirror 106 and to allow about a −30-degree to +100 degree range of motion. This range of motion for the elevation sub-assembly is about an axis nominally orthogonal to the azimuth sub-assembly's rotational axis. The tubular wall 126 also provides a cross-elevation opening 134, which is proximal to the mirror end 124. The cross-elevation opening 134 accommodates portions of the cross-elevation sub-assembly, which will be discussed in detail below. A motor bracket 138 is mounted to the mirror end 82 of the body and rotatably receives the spindle motor end 122. A spindle bracket 140 is also mounted to the mirror end 82 and is diametrically opposite the motor bracket 138. The spindle bracket 140 rotatably supports the spindle mirror end 124.

An elevation motor 142 is carried within and supported by the motor bracket 128. The elevation motor 142 is of a similar construction to the azimuth motor inasmuch as it is also direct drive, brushless, slotless, and two-phase. The elevation motor 142 is connected to the controller 28 via the slip rings 92 or otherwise as represented by signals E,E'. The elevation motor 142 imparts rotational movement to the spindle 120 up to −30-degree to +100 degrees. The spindle carries an encoder ring 143, and an encoder read head 144 is maintained within the motor bracket 138 in juxtaposition to the ring 143 so as to provide positional information to the controller 28 via an elevation position signal 146 also designated as F,F'.

An elevation gyroscope 150 is mounted to the spindle's tubular wall and generates an elevation sub-assembly elevation rate signal 152, also designated as G,G', that is received by the controller 28. The elevation gyroscope signal provides a measure of the inertial rate of the cross elevation sub-assembly about the elevation sub-assembly axis of rotation. This measured rate is used by the controller to generate the elevation motor drive signals that will stabilize the gimbal assembly directed line-of-sight and track a target as will be described below.

The elevation sub-assembly carries the cross-elevation sub-assembly 38. The cross-elevation sub-assembly includes a cross-elevation fold mirror 160, which is received in the chamber 130. In its' undeflected state, the fold mirror 160 is aligned with the azimuth fold mirror 106. Accordingly, the acquisition signal and its return signal are transmitted and received as the body and the spindle rotate within their respective ranges of motion. A cross-elevation, toroidally wound, direct drive single phase torque motor 164 is received in the chamber 130 between the mirror 160 and the mirror end 124 and allows for adjustment of ±7-degrees to the cross-elevation fold mirror 160. The motor 164 is linked to and powered by the controller 28 via signal lines H,H'. Because the cross-elevation rotation axis is nominally orthogonal to the optical rays to and from the azimuth mirror 106, the ±7 degrees of mechanical motion will provide ±14 degrees of cross-elevation optical motion. The cross-elevation fold mirror's axis of rotation is nominally orthogonal to the elevation and azimuth axes. Also associated with the cross-elevation fold mirror 160 is a cross-elevation transducer 166. This transducer is employed to measure the angular position of the fold mirror 160 and generates a position signal 168 (also designated as I,I') received by the controller.

A cross-elevation gyroscope 170 is mounted to the spindle motor end 122 and in particular to the end of the spindle 120 extending from the motor bracket 138. The cross-elevation gyroscope measurement axis is nominally orthogonal to that of the elevation gyroscope. The cross-elevation gyroscope 170 generates an elevation sub-assembly cross-elevation inertial rate signal 172 (J,J'), which is received by the controller 28.

The optical tracking device 10, configured as described above, directs the optical path from the laser and to the camera by rotations of the azimuth, elevation and cross-elevation sub-assemblies. Outward (i.e., away from the camera) from the camera fold mirror 62 the transmit and receive paths are common. Accordingly, any misalignments of the azimuth fold mirror 106 and the cross-elevation mirror 160 from their nominal orientations will not result in divergence of the transmit and receive optical paths.

Figure 4:
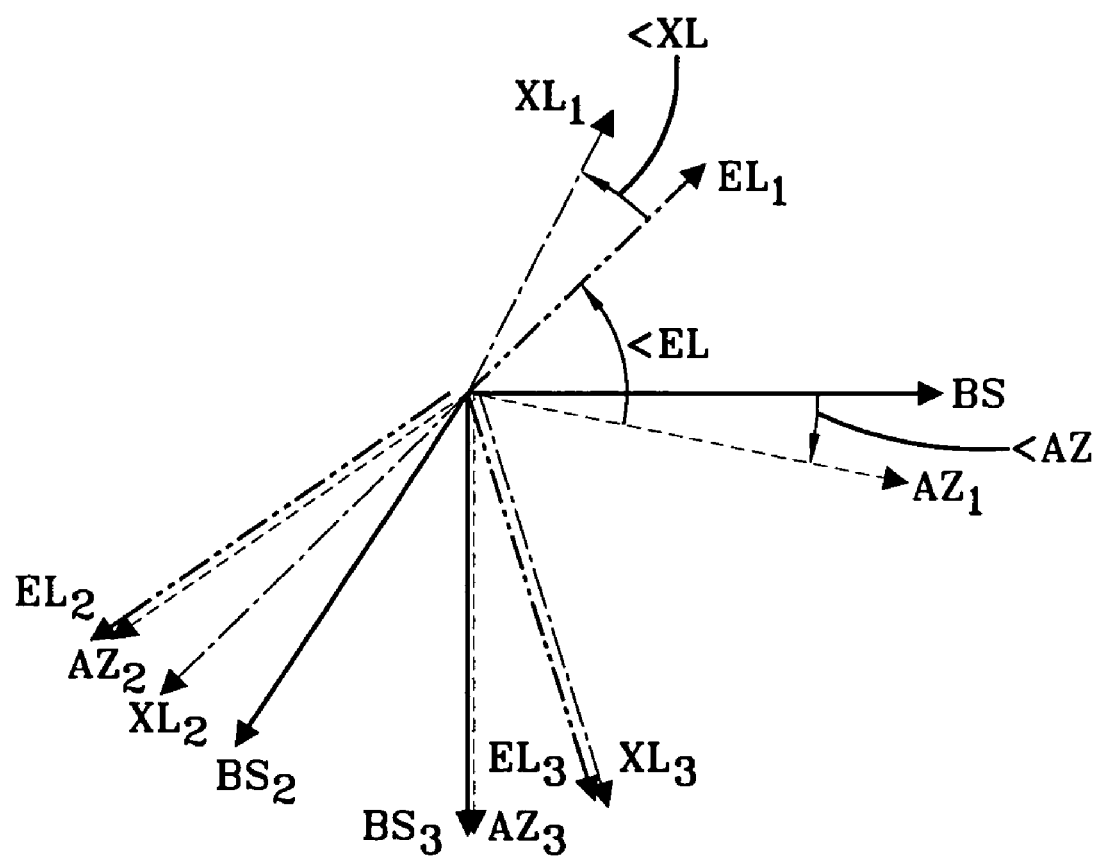
FIG. 4 is a schematic representation of the axes and movement of the device with respect thereto.

To facilitate a detailed description of the stabilization and tracking operations, reference is made to FIGS. 2 and 4 where five coordinate triads are defined, wherein a coordinate triad is a set of three mutually orthogonal unit vectors emanating from a common point. The location of the point is the location of the triad. The vectors of a triad are indexed by the numbers 1, 2, and 3 in the right hand sense. Generally, as seen in FIG. 4, the azimuth (AZ), elevation (EL) and cross-elevation (XL) angles are zero and the triads are aligned to one another. The AZ triad is obtained from the base triad (BS) by the rotation <AZ about vector $BS_3$. The EL triad is obtained from the AZ triad by the rotation <EL about vector $AZ_2$. And the XL triad is obtained from the EL triad by the rotation <XL about vector $EL_3$. It will be appreciated that in FIG. 2, the angles <AZ and <XL are zero, and the angle <EL is +90 degrees.

Specifically, as seen in FIGS. 2 and 4, the first triad designated by the letters BS (for base) is located at the intersection of the azimuth and elevation rotation axes with $BS_1$ into the page and $BS_3$ down. This triad is essentially affixed to the head sub-assembly 32; that is, it does not rotate relative to it. The second triad is designated by the letters AZ and is collocated with the BS triad with $AZ_1$ into the page and $AZ_3$ down; wherein the AZ triad is associated with the azimuth sub-assembly. The third triad is designated by the letters EL and collocated with the AZ and BS triads with $EL_1$ up and $EL_3$ into the page; wherein the EL triad is associated with the elevation sub-assembly. The fourth triad is designated by the letters XL and located at the center of the cross-elevation mirror on the cross-elevation axis with $XL_1$ up and $XL_3$ into the page; wherein the XL triad is associated with the cross-elevation fold mirror. Here $XL_1$ is along the directed line-of-sight.

The azimuth rotation angle is designated by <AZ, the elevation rotation angle is designated by <EL, and the cross-elevation angle is designated by <XL. The orientations of the above-defined triads are related to each other in terms of these angles. Starting from the BS triad, the AZ triad is obtained by a positive rotation of <AZ in the right hand sense about $BS_3$. From the AZ triad, the EL triad is obtained by a positive rotation of <EL about $AZ_2$. And from the EL triad, the XL triad is obtained by a positive rotation of <XL about $EL_3$.

In line with the above definitions, FIG. 2 corresponds to angles <AZ and <XL equal to 0-degrees and angle <EL equal to 90-degrees. This condition is commonly called the "nadir" orientation, in that the directed line-of-sight is at the lowest or down position relative to the base. This orientation is of particular significance in that a conventional two-axis elevation over azimuth gimbal assembly—one like that described herein but without the <XL degree of freedom—cannot, in general, track through or near nadir. This is because to do so would require physically unattainable azimuth sub-assembly accelerations. The mechanization described herein overcomes this limitation by implementing slew, stabilize, and track operations as described below.

The slew operation is that by which the gimbal assembly positions its directed line-of-sight to an orientation relative to the base coordinate triad such that the camera can observe the intended target within its field-of-view. The controller 28 commands the gimbal assembly so as to achieve an orientation defined by desired azimuth and elevation angles <AZ and <EL, as determined by the controller 28, to position the target within the camera's field-of-view; whereupon the controller commands the cross-elevation angle <XL to 0 during the slew operation.

Next, the controller 28 drives the gimbal assembly so as to inertially stabilize the directed line-of-sight. Here the inertial rates of the directed line-of-sight about its elevation and cross-elevation axes, $XL_2$ and $XL_3$ respectively, are commanded to zero. To facilitate this, the cross-elevation inertial rate of the directed line-of-sight, i.e., the rate of the $XL_1$ vector about $XL_3$, is estimated by the controller 28 by combining twice the differentiated cross-elevation position signal with the measured cross-elevation inertial rate of the elevation sub-assembly.

Finally, the controller drives the gimbal assembly so as to track the target. Here the inertial rates of the directed line-of-sight about the elevation and cross-elevation axes are commanded so as to null singly or doubly integrated track error signals as determined by the camera and controller over the entire gimbal assembly field-of-regard. The stabilization and track operations are accomplished by commanding the directed line-of-sight inertial rates as described above. Over most of the field-of-regard, the azimuth gimbal sub-assembly position <AZ is commanded so as to null the cross-elevation sub-assembly position signal <XL. Here the tracking is effectively accomplished by varying <AZ and <EL, with <XL essentially held to zero. However, within a small region of the field-of-regard about the nadir position, i.e., when the elevation angle is greater than 75 to 80 degrees, the azimuth gimbal sub-assembly position <AZ is commanded so that the elevation angle <EL does not exceed its +100-degree range of travel, and so that the non-nadir tracking can be smoothly reinstituted, should the directed line-of-sight leave the nadir region.

Based upon the foregoing, the advantages of the present invention are readily apparent. In particular, the three-axis gimbal mechanization allows the use of a common optical path, which allows for the use of a device that does not require difficult to achieve and maintain precision alignment of mirrors and minimizes the tracking device size so as to minimize its attendant aerodynamic drag. Moreover, the use of encoders and solid-state gyroscopes allows for stabilization and position feedback at a reduced cost. In other words, by employing common concentric transmit and return optical paths, the amount of optical blockage that the transmit path imposes on the acquisition signal is significantly reduced. The present invention is also advantageous in that it can accomplish tracking about and through the nadir position with relatively small range of motion for the cross-elevation gimbal sub-assembly, and this, allows for a smaller projection from the carrying aircraft fuselage, and, thus, imposes a smaller aerodynamic drag penalty. The present construction also minimizes laser backscatter and eliminates the need for precision alignment of transmit and receive pointer mirrors to maintain the co-linearity of those paths.

Thus, it can be seen that the objects of the invention have been satisfied by the structure and its method for use presented above. While in accordance with the Patent Statutes, only the best mode and preferred embodiment has been presented and described in detail, it is to be understood that the invention is not limited thereto or thereby. Accordingly, for an appreciation of the true scope and breadth of the invention, reference should be made to the following claims.

What is claimed is:

1. An electro-optical tracking device, comprising: an azimuth sub-assembly providing a 360-degree continuous range of motion; an elevation sub-assembly coupled to said azimuth sub-assembly, said elevation sub-assembly providing a −30-degree to +100 degree range of motion; a cross-elevation sub-assembly coupled to the elevation sub-assembly, said cross-elevation sub-assembly providing a ±14-degree range of motion; an elevation gyroscope coupled to the elevation sub-assembly and generating an elevation rate signal; a cross-elevation gyroscope coupled to the elevation sub-assembly and generating a cross-elevation signal; and a controller receiving said elevation and cross-elevation signals and sending command signals to said sub-assemblies to initiate movement within their respective ranges of motion to allow tracking of an object by the device.

2. The device according to claim 1, further comprising: a head sub-assembly coupled to said azimuth sub-assembly, said head sub-assembly carrying said controller; a coherent light source which generates an acquisition signal that is routed by said sub-assemblies toward the object, said light source carried by said head sub-assembly; and a camera which receives a return signal that is a reflection of said acquisition signal returned by the object, said return signal routed by said sub-assemblies, and said camera carried by said head sub-assembly.

3. The device according to claim 1, wherein said azimuth sub-assembly comprises: a casing; a body rotatably received within said casing, said body having a body bore extending there through; a column extending from said body, said column having a column opening aligned with said body bore; and an azimuth fold mirror carried by said column and selectively covering said column opening, said azimuth fold mirror directing said acquisition and return signals.

4. The device according to claim 3, wherein said elevation sub-assembly comprises: a spindle, said spindle having a motor end opposite a mirror end, wherein said ends are connected by a tubular wall which defines a chamber, said tubular wall having a column opening there through and a cross-elevation opening there through, said azimuth fold mirror extending through said column opening into said chamber; a motor bracket carried by said body, said motor bracket rotatably receiving said motor end; a spindle bracket carried by said body, said spindle bracket rotatably receiving said mirror end; and wherein said elevation gyroscope is carried by said spindle.

5. The device according to claim 4, wherein said cross-elevation sub-assembly comprises: a cross-elevation fold mirror carried in said chamber and selectively covering said cross-elevation mirror at least partially facing said azimuth fold mirror and directing said acquisition and return signals; a cross-elevation position actuator coupled to said cross-elevation mirror, said actuator receiving one of said command signals to adjust an angular position of said cross-elevation fold mirror; and wherein said cross-elevation gyroscope is carried by said spindle, but in a plane orthogonal to a plane of said elevation gyroscope.

6. The device according to claim 5, further comprising: a cross-elevation position transducer carried by said elevation sub-assembly, detecting the motion of the cross-elevation fold mirror, and generating a cross-elevation position signal that is received by the controller.

7. The device according to claim 1, further comprising: an azimuth encoder ring carried by said body; and an azimuth encoder read head carried by said casing, said azimuth read head detecting rotational movement of said body and generating an azimuth position signal that is received by said controller.

8. The device according to claim 1, further comprising: at least one slip ring having a casing contact carried by said casing and a body contact carried by said body, wherein said contacts maintain an electrical connection as said body rotates within said casing.

9. The device according to claim 8, further comprising: an elevation encoder ring carried by said spindle; and an elevation encoder read head carried by said motor bracket, said elevation read head detecting rotational movement of said spindle and generating an elevation position signal that is received by said controller.

10. An electro-optical tracking device, comprising: an azimuth sub-assembly providing a continuous range of motion; an elevation sub-assembly coupled to said azimuth sub-assembly; a cross-elevation sub-assembly coupled to the elevation sub-assembly; an elevation gyroscope coupled to the elevation sub-assembly and generating an elevation rate signal; a cross-elevation gyroscope coupled to the elevation sub-assembly and generating a cross-elevation signal; and a controller receiving said elevation and cross-elevation signals and sending command signals to said sub-assemblies to allow tracking of an object by the device.

11. The device according to claim 10, further comprising: a head sub-assembly coupled to said azimuth sub-assembly, said head sub-assembly canying said controller; a coherent light source which generates an acquisition signal that is routed by said sub-assemblies toward the object, said light source carried by said head sub- assembly; and a camera which receives a return signal that is a reflection of said acquisition signal returned by the object, said return signal routed by said sub- assemblies, and said camera carried by said head sub-assembly.

12. The device according to claim 10, wherein said azimuth sub-assembly comprises: a casing; a body rotatably received within said casing, said body having a body bore extending there through; a column extending from said body, said column having a column opening aligned with said body bore; and an azimuth fold mirror carried by said column and selectively covering said column opening, said azimuth fold mirror directing said acquisition and return signals, and wherein said elevation sub-assembly comprises: a spindle, said spindle having a motor end opposite a mirror end, wherein said ends are connected by a tubular wall which defines a chamber, said tubular wall having a column opening there through and a cross- elevation opening there through, said azimuth fold mirror extending through said column opening into said chamber; a motor bracket carried by said body, said motor bracket rotatably receiving said motor end; a spindle bracket carried by said body, said spindle bracket rotatably receiving said mirror end; and wherein said elevation gyroscope is carried by said spindle, and wherein said cross-elevation sub-assembly comprises: a cross-elevation fold mirror carried in said chamber and selectively covering said cross-elevation mirror at least partially facing said azimuth fold mirror and directing said acquisition and return signals; a cross-elevation position actuator coupled to said cross-elevation mirror, said actuator receiving one of said command signals to adjust an angular position of said cross-elevation fold mirror; and wherein said cross-elevation gyroscope is carried by said spindle, but in a plane orthogonal to a plane of said elevation gyroscope.

13. The device according to claim 10, further comprising: an azimuth encoder ring carried by said body; and an azimuth encoder read head carried by said casing, said azimuth read head detecting rotational movement of said body and generating an azimuth position signal that is received by said controller.

14. The device according to claim 10, further comprising: at least one slip ring having a casing contact carried by said casing and a body contact carried by said body, wherein said contacts maintain an electrical connection as said body rotates within said casing; and an elevation encoder ring carried by said spindle; andan elevation encoder read head carried by said motor bracket, said elevation read head detecting rotational movement of said spindle and generating an elevation position signal that is received by said controller.

15. The device according to claim 10, further comprising: a cross-elevation position transducer carried by said elevation sub-assembly, detecting the motion of the cross-elevation fold mirror, and generating a cross-elevation position signal that is received by the controller.

\* \* \* \* \*

UNITED STATES PATENT AND TRADEMARK OFFICE
CERTIFICATE OF CORRECTION

| | | |
|---|---|---|
| PATENT NO. | : 7,292,319 B1 | Page 1 of 1 |
| APPLICATION NO. | : 11/446619 | |
| DATED | : November 6, 2007 | |
| INVENTOR(S) | : Carter et al. | |

It is certified that error appears in the above-identified patent and that said Letters Patent is hereby corrected as shown below:

Column 10, line 52 (Claim 11, line 3) the word "canying" should read -- carrying --; and
Column 12, line 11 (Claim 14, line 6) the word "andan" should read -- and an --.

Signed and Sealed this

Sixth Day of May, 2008

JON W. DUDAS
*Director of the United States Patent and Trademark Office*